Oct. 10, 1950 W. A. HEINRICH 2,525,673

PACKAGE FOR ELECTRICAL DEVICES

Filed Jan. 24, 1949

INVENTOR

WALTER A. HEINRICH

BY Em Harrington

ATTORNEY

Patented Oct. 10, 1950 2,525,673

UNITED STATES PATENT OFFICE 2,525,673

PACKAGE FOR ELECTRICAL DEVICES

Walter A. Heinrich, Richmond Heights, Mo., assignor to James R. Kearney Corporation, St. Louis, Mo., a corporation of Missouri Application January 24, 1949, Serial No. 72,370

10 Claims. (Cl. 206—46)

This invention relates generally to packages and more specifically to packages for electrical devices of the type that are provided with bushings formed of porcelain or other frangible electrical insulating material which must be protected against damage that might result from rough or improper handling of the devices prior to installation thereof, the predominant object of the invention being to provide such a package which, because of its unique arrangement affords to a device packaged thereby the desired and required protection against damage to the bushings thereof.

Prior to this invention certain electrical devices, capacitors, for instance, which have porcelain bushings extended upwardly therefrom, were usually handled improperly by warehouse workers, deliverymen, and other workers who grasped the bushings when lifting or carrying the devices. As a result of such improper handling of the devices by workers the bushings were frequently pulled loose from the devices, or the bushings were broken, whereby the devices were rendered unfit for use and had to be discarded or returned to the factory for repair and reconditioning. The main purpose of this invention is to provide a package for electrical devices of the type referred to above which is so constructed and so assembled with an electrical device that it is impossible for a worker to lift or carry a packaged device by grasping the bushings thereof, whereby damage to the device because of such improper handling thereof is entirely eliminated.

Figure 1:
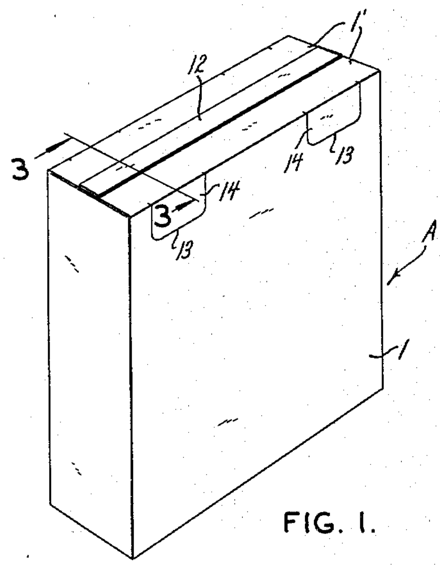
Fig. 1 is a perspective view of the improved package of this invention.
Figure 2:
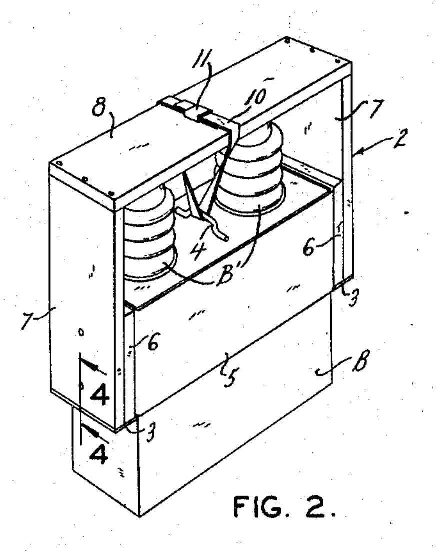
Fig. 2 is a perspective view of a capacitor having the inner frame structure of the improved package assembled therewith, the outer carton of the package which is shown in Fig. 1 being omitted in Fig. 2.
Figure 3:
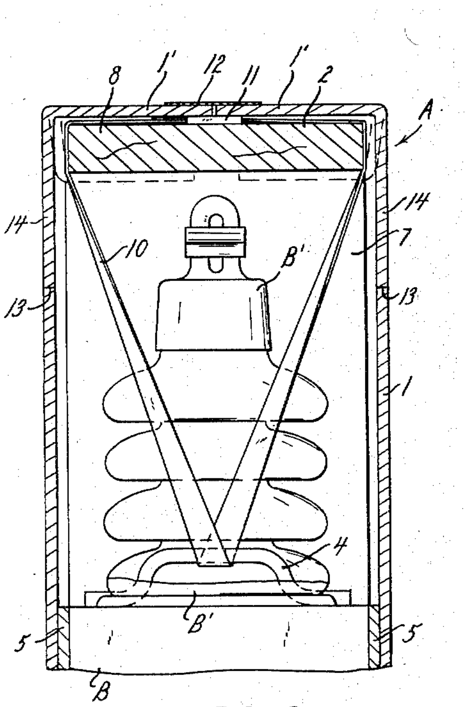
Fig. 3 is an enlarged, fragmentary section taken on line 3—3 of Fig. 1.

In the drawing, wherein is shown for purposes of illustration, merely, one embodiment of the invention, A designates the improved package generally, said package comprising an outer carton 1 formed of corrugated board, or other suitable material, and an inner frame structure 2 which is assembled with an electrical device B. The particular electrical device illustrated in the drawing is a capacitor, although the improved package is not limited to use as a package for such particular electrical device, and the capacitor B is shown in Figs. 2 and 3 as being provided with a pair of bushings B′ that extend upwardly from the casing of the capacitor and are formed of porcelain, or other suitable electrical insulating material. The capacitor B has welded, or otherwise secured to its opposite end walls, a pair of angle members 3, there being one angle member 3 secured to each end wall of the casing of the capacitor. Also, the top wall of the capacitor has welded, or otherwise secured thereto, a handle 4 which serves a purpose to be hereinafter set forth.

Figure 4:
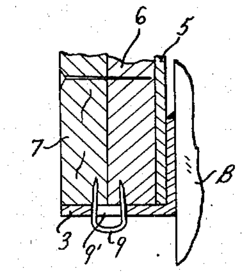
Fig. 4 is an enlarged, fragmentary section taken on line 4—4 of Fig. 2.

Arranged about the upper portion of the casing of the capacitor B in embracing relation with respect thereto is a band 5 of cardboard, the lower edge of said band of cardboard contacting with the horizontal legs of the angle members 3 and inner face portions of said band of cardboard being in contact with the outer faces of the vertical legs of said angular members 3 (Fig. 4). Supported by the horizontal legs of the angular members 3 is a pair of frame elements 6, there being one of these frame elements 6 at each end of the capacitor B with the lower edges of said frame elements in contact with the top faces of the horizontal legs of the angular members 3 and with the top edges of said frame elements disposed substantially flush with the top surface of the top wall of the casing of the capacitor B. Also, the inner faces of the frame elements 6 are in contact with the outer faces of the portions of the band of cardboard 5 which are located adjacent to the end walls of the capacitor, as is also shown in Fig. 4.

Secured to the frame elements 6 by nails or other suitable fastening devices is a pair of opposed frame members 7, the lower edges of said frame members 7 contacting with the top faces of the horizontal legs of the angular members 3, and said frame members 7 extending upwardly a substantial distance above the top wall of the casing of the capacitor B, as is shown to good advantage in Fig. 2. The opposed frame members 7 support a top frame member 8 which is secured at its opposite ends to said opposed frame members 7 by nails, or other suitable fastening devices, said top frame member 8 being disposed just above the tops of the bushings B′ of the capacitor B, as is shown in Fig. 3. The horizontal legs of the angular members 3 are provided with slots 9′ through which staples 9 are extended, the legs of each of said staples being driven into a related pair of the frame elements 7 and the end frame members 8, as is shown in Fig. 4. The projection of the staples 9 through the slots of horizontal legs of the angular members 3 retains the lower portions of the related frame elements 6 and end frame members 7 in proper position with respect to said horizontal legs of said angular members whereby displacement of said lower portions of said frame elements and frame members relative to the angle members is prevented.

The improved package of this invention includes a strip 10 of metal, or other suitable material, which is extended through the handle 4, as is shown in Figs. 2 and 3, and which extends upwardly from said handle and passes about the upper portion of the top frame member 8. The strip 10 is drawn taut and its overlapped end portions are connected together immediately above the top frame member 8, and in contact with the upper face thereof, by a suitable clip 11. The strip 10 attaches the frame structure 2 to the casing of the capacitor B in a very secure manner, and as previously stated herein, the extension of the staples 9 through the slots 9' of the horizontal legs of the angular members 3 maintain the opposed lower portions of said frame structure in proper position relative to said angular members.

The outer carton 1 of the improved package of this invention receives the assembly of the capacitor B and the frame structure 2, shown in Fig. 2, said outer carton being provided with a top wall which is composed of a pair of flaps 1' and said flaps being secured in their closed positions when the carton is sealed by a strip of gummed tape 12, or by other suitable means. The opposed side walls of the outer carton 1 are provided each with a pair of U-shaped slits 13 which provide flaps 14 therewithin which are displaceable to provide hand holes, through said opposed walls of said outer carton, said flaps 14 being displaceable to the positions in which they are shown by dotted lines in Fig. 3 where they are disposed immediately beneath the top frame member 8.

When a capacitor enclosed within the improved package of this invention is being handled, the person handling the packaged capacitor extends one or both of his hands through one or a pair of the hand holes provided by displacement of flaps 14. This brings his hand or hands into contact with the under side of the top frame member 8 and he may lift and carry the packaged capacitor in a very convenient manner without any danger that damage may be done to the bushings of the capacitor. When it is desired to remove the capacitor from the package the gummed tape 12 is cut or torn to release the flaps 1' forming the top wall of the outer carton 1. The person unpacking the capacitor may then reach into the outer carton and grasp the top frame member 8 and lift the assembly comprised of the capacitor and the frame structure 2 out of the outer carton 1. The strip 10 is then cut after which the frame structure 2 may be lifted off of the capacitor and the cardboard band may be removed therefrom. If it should be necessary to handle the capacitor after removal of the frame structure 2 the handle 4 may be employed for lifting and carrying same.

From the foregoing it is plain that the packaged capacitor may be lifted and carried about without any danger that damage would be done to the bushings of the capacitor. Also, in like manner, the assembly of the capacitor and the frame structure 2, shown in Fig. 2, may be lifted and carried about with equal safety to the bushings, the top frame member being grasped by a person lifting or carrying such assembly. Finally, if it should be necessary to lift or carry the capacitor after its removal from the outer carton and removal of the frame structure 2, this may be accomplished in a convenient and safe manner by grasping the handle 4.

It is important to note that a capacitor packaged in accordance with this invention may be hoisted to the upper portion of a pole, or other support, where it is to be supported, and may be introduced into its mounting at the elevated point before the receptacle A is removed therefrom. This is possible because the lower portion of the receptacle A is spaced upwardly from the bottom of the capacitor and it is the lower portion of the capacitor which is received by the capacitor mounting for supporting the capacitor. Therefore, because the bushings of the capacitor are protected by the receptacle A during elevation of the capacitor to its elevated position, no damage can be done to the bushings, as would be possible if the bushings were unprotected as was the case heretofore, and when the capacitor has been properly disposed in its mounting the receptacle A may be removed therefrom in the manner hereinbefore described.

I claim:

1. A package for an electrical device having a bushing extended upwardly from the upper portion of the casing thereof and having members secured to walls of the casing of said electrical device, said package comprising a frame structure which is adapted to be assembled with the electrical device at the upper portion thereof in such manner that said frame structure embraces the bushing of the electrical device, said frame structure comprising opposed vertically arranged end members and a horizontal top member which is secured adjacent to its opposite ends to said opposed vertically arranged end members, the lower edges of said vertically arranged end members being adapted to contact with said members of said electrical device so as to support said frame structure with respect to said electrical device, and a tie element which is adapted to engage a part of the electrical device and which passes over said horizontal top member in contact therewith for securing said frame structure to the electrical device.

2. A package for an electrical device having a bushing extended upwardly from the upper portion of the casing thereof and having members secured to walls of the casing of said electrical device, said package comprising a frame structure which is adapted to be assembled with the electrical device at the upper portion thereof in such manner that said frame structure embraces the bushing of the electrical device, said frame structure comprising opposed vertically arranged end members, frame elements secured to said opposed vertically arranged end members at the lower portions thereof, and a horizontal top member which is secured adjacent to its opposite ends to said opposed vertically arranged end members, the lower edges of said vertically arranged end members being adapted to contact with said members of said electrical device so as to support said frame structure with respect to said electrical device, and a tie element which is adapted to engage a part of the electrical device and which passes over said horizontal top member in contact therewith for securing said frame structure to the electrical device.

3. A package for an electrical device having a casing from which is extended a bushing and having angle members secured to opposed walls of the casing of the electrical device, said package comprising a frame structure which is adapted to be assembled with the electrical device at the upper portion thereof in such manner that said frame structure embraces the bushing of the electrical device, said frame structure comprising opposed vertically arranged end members, frame elements secured to said opposed vertically arranged end members at the lower portions thereof, and a horizontal top member which is secured adjacent to its opposite ends to said opposed vertically arranged end members, the lower edges of said vertically arranged end members and said frame elements being adapted to contact with the angle members of the electrical device so as to support said frame structure in such manner that said frame structure embraces the bushing of the electrical device, and a tie element which is adapted to engage a part of the electrical device and which passes over said horizontal top member in contact therewith for securing said frame structure to the electrical device.

4. A package for an electrical device having a casing from which is extended a bushing and having angle members secured to opposed walls of the casing of the electrical device, said package comprising a frame structure which is adapted to be assembled with the electrical device at the upper portion thereof in such manner that said frame structure embraces the bushing of the electrical device, said frame structure comprising opposed vertically arranged end members, frame elements secured to said opposed vertically arranged end members at the inner faces of the lower portions thereof, and a horizontal top member which is secured adjacent to its opposite ends to said opposed vertically arranged end members, the lower edges of said vertically arranged end members and said frame elements being adapted to contact with the angle members of the electrical device so as to support said frame structure in such manner that said frame structure embraces the bushing of the electrical device, and a tie element which is adapted to engage a part of the electrical device and which passes over said horizontal top member in contact therewith for securing said frame structure to the electrical device.

5. A package for an electrical device having a casing from which is extended a bushing and having angle members secured to opposed walls of the casing of the electrical device, said package comprising a frame structure which is adapted to be assembled with the electrical device at the upper portion thereof in such manner that said frame structure embraces the bushing of the electrical device, said frame structure comprising opposed vertically arranged end members, frame elements secured to said opposed vertically arranged end members at the inner faces of the lower portions thereof, and a horizontal top member which is secured adjacent to its opposite ends to said opposed vertically arranged end members, the lower edges of said vertically arranged end members and said frame elements being adapted to contact with the angle members of the electrical device so as to support said frame structure in such manner that said frame structure embraces the bushing of the electrical device, a tie element which is adapted to engage a part of the electrical device and which passes over said horizontal top member in contact therewith for securing said frame structure to the electrical device, and projected elements secured to the lower portions of said opposed vertically arranged end members and said frame elements which extend through slots formed in the angle members of the electrical device.

6. A package for an electrical device having a casing from which is extended a bushing and having angle members secured to opposed walls of the casing of the electrical device, said package comprising a frame structure which is adapted to be assembled with the electrical device at the upper portion thereof in such manner that said frame structure embraces the bushing of the electrical device, said frame structure comprising opposed vertically arranged end members, frame elements secured to said opposed vertically arranged end members at the inner faces of the lower portions thereof, and a horizontal top member which is secured adjacent to its opposite ends to said opposed vertically arranged end members, the lower edges of said vertically arranged end members and said frame elements being adapted to contact with the angle members of the electrical device so as to support said frame structure in such manner that said frame structure embraces the bushing of the electrical device, a tie element which is adapted to engage a part of the electrical device and which passes over said horizontal top member in contact therewith for securing said frame structure to the electrical device, and projected elements comprising staples secured to the lower portions of said opposed vertically arranged end members and said frame elements which extend through slots formed in the angle members of the electrical device.

7. A package for an electrical device having a casing from which is extended a bushing and having angle members secured to opposed walls of the casing of the electrical device, said package comprising a frame structure which is adapted to be assembled with the electrical device at the upper portion thereof in such manner that said frame structure embraces the bushing of the electrical device, said frame structure comprising opposed vertically arranged end members, frame elements secured to said opposed vertically arranged end members at the inner faces of the lower portions thereof, and a horizontal top member which is secured adjacent to its opposite ends to said opposed vertically arranged end members, the lower edges of said vertically arranged end members and said frame elements being adapted to contact with the angle members of the electrical device so as to support said frame structure in such manner that said frame structure embraces the bushing of the electrical device, a tie element which is adapted to engage a handle part of the electrical device and which passes over said horizontal top member in contact therewith for securing said frame structure to the electrical device, and projected elements secured to the lower portions of said opposed vertically arranged end members and said frame elements which extend through slots formed in the angle members of the electrical device.

8. A package for an electrical device having a casing from which is extended a bushing and having angle members secured to opposed walls of the casing of the electrical device, said package comprising a frame structure which is adapted to be assembled with the electrical device at the upper portion thereof in such manner that said frame structure embraces the bushing of the electrical device, said frame structure comprising opposed vertically arranged end members, frame elements secured to said opposed vertically arranged end members at the inner faces of the lower portions thereof, and a horizontal top member which is secured adjacent to its opposite ends to said opposed vertically arranged end members, the lower edges of said vertically arranged end members and said frame elements being adapted to contact with the angle members of the electrical device so as to support said frame structure in such manner that said frame structure embraces the bushing of the electrical device, a tie element which is adapted to engage a part of the electrical device and which pases over said horizontal top member in contact therewith for securing said frame structure to the electrical device, projected elements secured to the lower portions of said opposed vertically arranged end members and said frame elements which extend through slots formed in the angle members of the electrical device, and a band of material which embraces the upper portion of the casing of the electrical device.

9. A package for an electrical device having a bushing extended upwardly from the upper portion of the casing thereof, said package comprising a frame structure which is adapted to be assembled with the electrical device at the upper portion thereof in such manner that said frame structure embraces the bushing of the electrical device, said frame structure comprising opposed vertically arranged end members and a horizontal top member which is secured adjacent to its opposite ends to said opposed vertically arranged end members, a tie element which is adapted to engage a part of the electrical device and which passes over said horizontal top member in contact therewith for securing said frame structure to the electrical device, and an outer carton which receives the assembled electrical device and frame structure, walls of said outer carton being provided with flaps that are displaceable to provide hand holes through which said horizontal top member of the frame structure may be grasped in carrying the packaged electrical device.

10. A package for an electrical device having a bushing extended upwardly from the upper portion of the casing thereof, said package comprising a frame structure which is adapted to be assembled with the electrical device at the upper portion thereof in such manner that said frame structure embraces the bushing of the electrical device, said frame structure comprising opposed vertically arranged end members and a horizontal top member which is secured adjacent to its opposite ends to said opposed vertically arranged end members, a tie element which is adapted to engage a part of the electrical device and which passes over said horizontal top member in contact therewith for securing said frame structure to the electrical device, and an outer carton which receives the assembled electrical device and frame structure, walls of said outer carton being provided with flaps that are displaceable inwardly to provide hand holes through which said horizontal top member of the frame structure may be grasped in carrying the packaged electrical device.

WALTER A. HEINRICH.

REFERENCES CITED

The following references are of record in the file of this patent:

UNITED STATES PATENTS

| Number | Name | Date |
|---|---|---|
| 2,134,908 | Copeman | Nov. 1, 1938 |